Feb. 4, 1936.   A. F. CRAVER   2,029,987
ELECTRIC WATER HEATER
Filed April 21, 1930
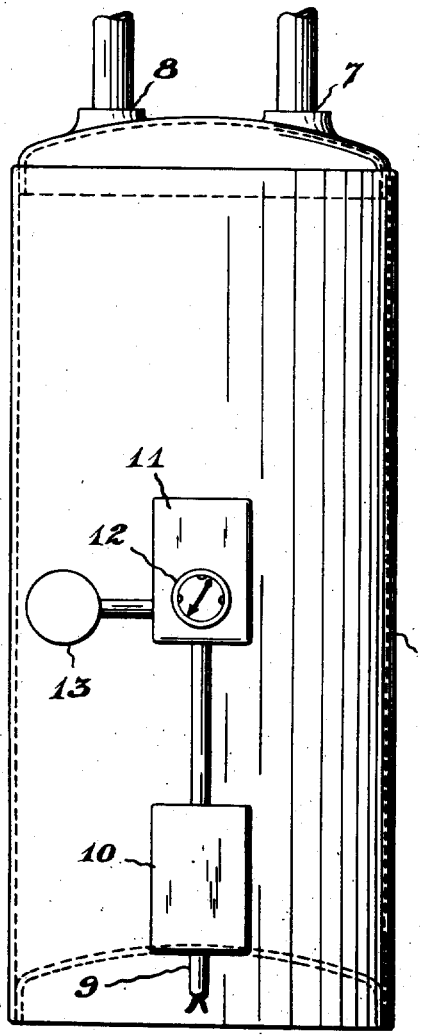
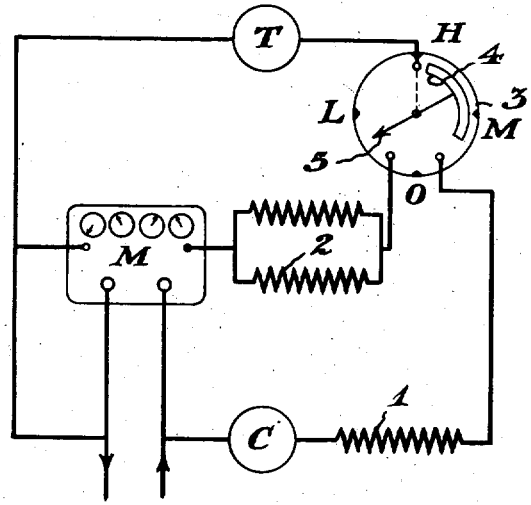
Fig. 2.
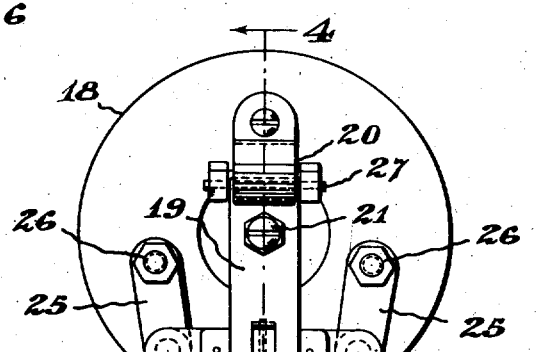
Fig. 1.   Fig. 3.
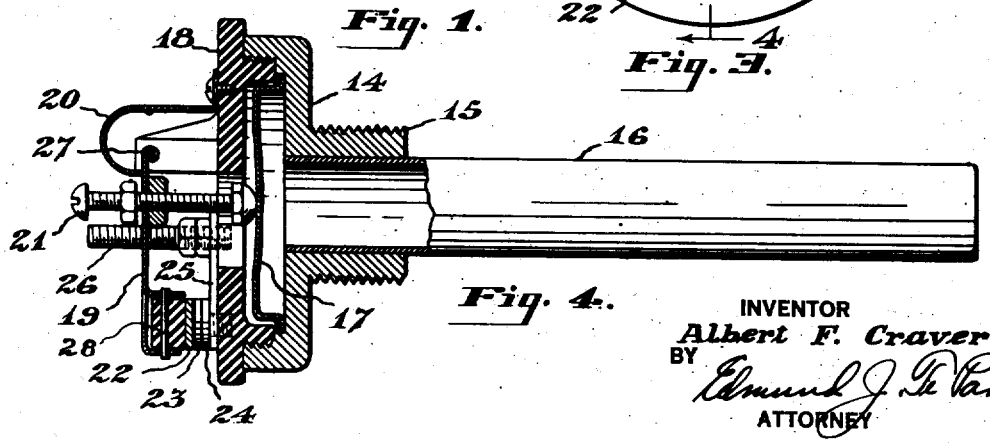
Fig. 4.
INVENTOR
Albert F. Craver
BY
ATTORNEY Patented Feb. 4, 1936

2,029,987

UNITED STATES PATENT OFFICE 2,029,987

ELECTRIC WATER HEATER

Albert F. Craver, Lakewood, Ohio, assignor to The Cleveland Heater Company, Cleveland, Ohio, a corporation of Ohio Application April 21, 1930, Serial No. 445,958

4 Claims. (Cl. 219—38)

This invention relates to electric water heaters and particularly electric water heaters for hot water supply purposes.

It is the purpose of this invention to provide an electric water heater which is adapted in respect to the use of electric current to meet the requirements of the power company and at the same time to meet the hot water requirements of the direct users of the heater.

With this object in view, I have constructed a generally simplified electric water heater having a plurality of heating elements located at different points in a hot water storage tank for the purpose which will hereinafter be described. The said heating elements are adapted to be connected at different points of the electrical supply circuit in order to provide an electrical heater that may be operated in a variety of ways to provide in one and the same installation a constant or flat rate heater with provision for peak load heating and novel control devices cooperating therewith.

With the above mentioned and other objects in view, the invention consists in the novel construction, arrangement and combination of parts, hereinafter described, illustrated in some of its embodiments in the accompanying drawing and particularly pointed out in the appended claims.

Referring to the drawing, Fig. 1 illustrates the storage tank of my improved heater. Fig. 2 is the wiring diagram showing the electric circuits for the control and supply of electric current to the heater. Fig. 3 is a plan elevational view showing the end of the thermostatic switch for controlling the operation of the heater and Fig. 4 is a section of the thermostat taken on line 4—4 Fig. 3.

In the heater illustrated for the purpose of disclosing my invention, the numeral 6 refers to a storage tank having a pair of tapped openings in the top for the cold water supply inlet and the hot water supply outlet 7 and 8 respectively. The cold water supply line may be extended from the top of the tank to a point adjacent the bottom thereof by means of a dip pipe (not shown) as is conventional in such water heaters.

The electric conductors are carried to the heater in a flexible conduit 9 leading to the lower and upper horizontally disposed immersion heating elements 10 and 11 respectively which are manually controlled by a three-way switch 12 and a thermostat 13, the thermostat being adapted to cut off the current supply to the elements 10 and 11 when the temperature of the water reaches a predetermined point.

The control circuit illustrated in Fig. 2 comprises the pair of feed wires from the power supply line shown as connected to the integrating meter M. The feed wire in series with the stationary coils of the meter is connected in parallel to the heating resistor elements 1 and 2 which correspond to the lower and upper heating elements 10 and 11 of the water heater, the element 2 being of larger capacity than the element 1. The heating elements are controlled through the three-heat switch 3 adapted to selectively control the supply of current to the heating elements 1 and 2. With the switch pointer at the point L, current is supplied from the feed line ahead of the meter to the resistor or heating element 1. With the switch pointer at H the current is supplied to the heating element 1 ahead of the meter and to the heating element 2 behind the meter so that the current used in the element 2 is recorded on the meter M. With the switch pointer at M the current is supplied only to the heating element 2 by way of the integrating meter M. With the switch indicator at O the circuit to both the heating elements 1 and 2 is opened and their operation is thus cut off.

A thermostatic switch T shown in detail in Figures 3 and 4 is located in the ground or return wire of the circuit leading to the control switch 3. This thermostat is adapted upon the temperature of the water in the tank reaching a predetermined point to operate with a snap movement to break the circuit and cut off the operation of both the heating elements 1 and 2. A clock controlled switch C is located in the circuit of the heating element 1 so that this element may be continuously operated or operated for certain predetermined times of the day. Such clock switches are ordinarily constructed with a synchronous motor and are adapted to operate continuously as long as they are supplied with electric current. The details of the clock switch C are not shown as these switches are well known and the clock switch by itself does not form a part of this invention.

My improved thermostatic switch comprises an element 14 having a reduced threaded portion 15 which is adapted to be received in a threaded opening in the tank so that the thermostat tube 16 projects a distance within the tank and is in contact with the liquid contents thereof. The buckling diaphragm 17 is supported over the open end of the tube 16 and serves in combination therewith to provide a chamber for the confinement of an expansible or thermo-sensitive fluid which is adapted to respond to water temperatures within the tank and to flex the diaphragm 17 and operate a switch at a predetermined temperature to prevent further heating of the water by the electric heating elements.

The member 14 is provided with a cap 18 formed from an insulating material such as hard rubber which supports the operating elements of the thermostatic switch. A lever 19 is pivotally supported to the member 18 at 27 and is restrained in its movement by a spring 20.

The lever 19 carries an adjustable pin or screw 21 adapted to engage the diaphragm 17 and to transmit the movement of the diaphragm to the lever 19. The outer end of the lever 19 is provided with a conducting cross-bar 22, pivotally supported at 23 for limited movement and having a pair of contact members 23 at the end portions thereof. The contact members 23 are adapted to make contact with a pair of contact members 24 carried by the element 18 and connected by means of conductors 25 to the binding posts 26. The return wire of the circuit is adapted to be connected through the thermostat to the two-heat switch.

From the foregoing it is apparent that I have provided an electric water heater system adapted to answer a variety of needs. It is common practice among the electric power companies to furnish electric current at different rates for different times of the day. Low rates are usually provided for the use of current during the early hours of the day as between the hours of midnight and 7:00 o'clock in the morning.

With my improved water heater and clock switch the water heater is automatically supplied with electric current during this period so that at 7:00 o'clock in the morning a tank full of hot water will be available for use. Current for this purpose is supplied at a flat rate of (so much) a month by the power company and where the user desires additional supply of hot water the same may be had by operating the manually controlled switch to throw in a second high capacity heating element which is positioned adjacent the top of the tank so that quick recovery or heating is obtained by reason of the size of the element and its position near the outlet of the heater.

Where it is desired to operate the heating element 1 continuously, the clock switch may be eliminated and by the selection of a proper size resistor a water heater may be provided in which the heater builds up a reserve supply during such times as it is not in use so that there is available a constant limited supply of hot water for ordinary requirements and for additional hot water requirements the element 2 may be brought into use.

In such localities where the electric power companies make no special rates for "off-peak" heating the meter box may be located in the electric circuit ahead of the heating element 1 so that the current supplied to all of the heating elements of the heater must pass through the meter. With this arrangement the normal operation of the heater would call for the continuous use of the element 1 which for the particular purpose would be of a capacity to supply the normal hot water demands and for extraordinary demands the heating element 2 could be thrown into use.

The heating elements 10 and 11 are of the immersion type and are horizontally disposed within the tank 6 so that the heat produced thereby is directly transmitted to the water with a minimum heat loss. The upper immersion heating element 11 by reason of being located within the tank practically only heats the water above it due to the low thermal conductivity of water and the induced circulation caused by the heated water rising from the element. By reason of the arrangement just stated quick heating may be provided for a definite and predetermined portion of the fluid contents of the tank by installing the element 11 at the desired level in the tank.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

I claim:

1. In an electric water heater, in combination, a hot water storage tank, a cold water supply conduit communicating with said tank, a conduit for the withdrawal of hot water communicating with said tank, a low capacity electric heating element located in said tank adjacent to the bottom thereof, a high capacity electric heating element located in said tank on a level a substantial distance above said first named heating element, a source of electrical energy, a thermostatic switch located in said tank adjacent the upper heating element, said thermostatic switch controlling the supply of electrical energy to both of said heating elements, a meter for recording the consumption of electrical energy of said high capacity heating element only, and a manual switch for selectively connecting either said first named heating element or both said heating elements to said source of electrical energy.

2. In an electric water heater, in combination, a hot water storage tank, a cold water supply conduit communicating with said tank, a conduit for the withdrawal of hot water communicating with said tank, a low capacity electric heating element located in said tank adjacent to the bottom thereof, a high capacity electric heating element located in said tank on a level a substantial distance above said first named heating element, a source of electrical energy, a thermostatic switch located in said tank adjacent the upper heating element, said thermostatic switch controlling the supply of electrical energy to both of said heating elements, a meter for recording the consumption of electrical energy of said high capacity heating element only, a time switch for controlling the operation of said low capacity heating element only, and a manual switch for selectively connecting either said first named heating element or both said heating elements to said source of electrical energy.

3. In a fluid heater, a heating unit, a line conveying the heating medium thereto, a clock control mechanism in said line ahead of said unit, a cut-off in said line behind said unit, a thermostat cut-off behind said first cut-off, a second line connected with said first line ahead of said clock, a second heating unit in said second line, a meter in the second line ahead of its heating unit, said second line also passing into said aforementioned cut-off and thence into said first line and the thermostatic mechanism, said thermostatic cut-off being thus adapted to cut off both heating units, and said switch being adapted to cut in either or both of said heating units.

4. In a fluid heater, means for supplying certain energy to be converted into heat, unmetered, so that it may be sold at a flat rate, means for supplying additional energy, a meter for measuring only said last named energy whereby it may be sold at a quantitative rate, and a cut-off for controlling whether one or both of said supplies shall be used, a thermostatic cut-off controlling both said supplies, and a single manual cut-off for selectively engaging either or both said supplies, said thermostatic cut-off being adapted to cut off the energy when said manual cut-off has cut in either or both said supplies.

ALBERT F. CRAVER.